(12) United States Patent
Schmidt et al.

(10) Patent No.: US 6,670,888 B2
(45) Date of Patent: Dec. 30, 2003

(54) METHOD OF DETECTING IMPROPER MOUNTING OF ACCELERATION SENSORS ON A VEHICLE

(75) Inventors: Joachim Schmidt, Plymouth, MI (US); Frank-Juergen Stuetzler, Farmington Hills, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/079,963

(22) Filed: Feb. 21, 2002

(65) Prior Publication Data

US 2003/0016124 A1 Jan. 23, 2003

Related U.S. Application Data

(60) Provisional application No. 60/305,976, filed on Jul. 17, 2001.

(51) Int. Cl.[7] .............................................. G08B 21/00
(52) U.S. Cl. ..................... 340/687; 340/669; 340/657; 340/647; 340/661; 73/1.38; 73/1.39; 73/493; 73/495
(58) Field of Search ................................ 340/687, 669, 340/657, 647, 644, 661; 73/1.38, 1.39, 493, 495, 498

(56) References Cited

U.S. PATENT DOCUMENTS

| | | | |
|---|---|---|---|
| 4,950,915 A | | 8/1990 | Spies et al. |
| 4,975,800 A | | 12/1990 | Oshita et al. |
| 5,124,687 A | * | 6/1992 | Okumura et al. ............ 340/647 |
| 5,203,821 A | * | 4/1993 | Tanaka ......................... 73/1 D |
| 5,373,722 A | | 12/1994 | Spies et al. |
| 5,457,982 A | | 10/1995 | Spies et al. |
| 5,753,793 A | * | 5/1998 | Lindahl et al. ............... 73/1.38 |
| 5,900,529 A | * | 5/1999 | Hanisko et al. .............. 73/1.38 |
| 6,167,744 B1 | | 1/2001 | Akimoto et al. |

* cited by examiner

*Primary Examiner*—Daniel J. Wu
*Assistant Examiner*—Hung Nguyen
(74) *Attorney, Agent, or Firm*—Michael Best & Friedrich LLP (57) ABSTRACT

A method of detecting the improper mounting of a sensor on a motor vehicle includes monitoring the output signals of the sensor, determining the noise levels in the output signals, and comparing the noise levels from the output signals to a threshold noise value to determine if the sensor is properly mounted. Preferably, the method monitors the output signals of a first sensor and a second sensor, determines the noise levels in the output signals being emitted by each of the sensors, and compares the noise levels of the first sensor to the noise levels of the second sensor to determine if the sensors are properly mounted.

31 Claims, 4 Drawing Sheets

METHOD OF DETECTING IMPROPER MOUNTING OF ACCELERATION SENSORS ON A VEHICLE

RELATED APPLICATIONS

This application claims priority to co-pending U.S. Provisional Application Ser. No. 60/305,976, filed Jul. 17, 2001.

FIELD OF THE INVENTION

The invention relates to electronic crash detection systems for vehicles, and more specifically to the acceleration sensors used with the electronic crash detection systems.

BACKGROUND OF THE INVENTION

Electronic crash detection systems utilize acceleration sensors to detect if a vehicle is involved in a crash. In the event of a crash, restraint devices are deployed to protect the occupants of the vehicle. Traditionally, a central control unit located within the passenger compartment of the vehicle contains one or more accelerometers that measure the deceleration within the passenger compartment. If the deceleration threshold is reached, the restraints are deployed.

More recently, additional peripheral accelerometers are being mounted in various locations on the frame of the vehicle to improve the performance of the crash detection systems. For example, additional accelerometers may be located in the crumple zones of the vehicle. Furthermore, additional accelerometers may be located on the sides of the vehicle to detect side impacts. Currently, most peripheral acceleration sensors used with crash detection systems are mounted to the vehicle's frame with screws or bolts.

It is important to ensure that each sensor is properly mounted on the vehicle and that each sensor remains properly mounted over the operational lifetime of the vehicle. Proper mounting of the sensors is crucial for the proper functioning of the crash detection systems. If a sensor is improperly mounted or later becomes loose, the measured acceleration signals will not be accurate and the crash detection system may not function as intended.

One commonly used method to ensure proper sensor mounting is to detect an electric ground between the sensor and the mounting location. This method assumes that the sensor must be properly affixed to the vehicle to maintain an electrical connection between the sensor and the frame. If the electrical connection is broken, the sensor is determined to be separated from the frame.

Other methods used in the art include sending a vibrational/acoustical test signal to the sensor, thereby causing the sensor to resonate and produce an output signal that can be measured and compared to predetermined values to determine if the sensor is properly mounted. U.S. Pat. Nos. 4,950,915, 5,373,722 and 5,457,982 disclose examples of these methods.

SUMMARY OF THE INVENTION

These prior art methods of ensuring proper sensor mounting present various problems. For example, the method of detecting an electrical ground between the sensor and the mounting location requires the installation of specific detection hardware. This increases the material and manufacturing costs for the system and makes the system more difficult to install. Furthermore, this prior art method is not able to distinguish between a properly mounted sensor and a loose sensor when the electrical connection for the loose sensor remains at least partially intact.

The other methods utilizing acoustical/vibrational signal comparisons require the installation of various types of signal generators for producing the test signals. This increases the material and manufacturing costs for the system and makes the system more difficult to install.

In light of these problems, the present invention provides a method and system of ensuring proper sensor mounting by monitoring the noise levels of the signals generated by the acceleration sensors. All driving conditions generate vibrations in a vehicle that cause a certain level of "noise" in the measured acceleration signals. A loose sensor will generate a higher level of noise than a properly mounted sensor. By monitoring the noise levels of different acceleration sensors and comparing those monitored levels with a predetermined noise threshold or with the noise levels of one or more counterpart sensors, a loose sensor can be detected.

The method and system of the present invention is less expensive to implement and is more reliable than previous methods because little or no additional hardware is required for implementation. The same processor used to interpret the acceleration signals can be used to monitor and compare the noise levels present in the signals.

More specifically, the invention provides a method of detecting the improper mounting of a sensor on a motor vehicle where the sensor emits output signals. The method comprises the steps of monitoring the output signals of the sensor, determining the noise levels in the output signals and comparing the noise levels from the output signals to a threshold noise value to determine if the sensor is properly mounted.

In one aspect of the invention, the threshold noise value can be predetermined based on vehicle characteristics or can be determined from another sensor mounted on the vehicle. In another aspect of the invention, the sensors will issue a warning when the noise levels exceed the threshold noise value. In yet another aspect of the invention, the sensors will increment a counter each time the threshold value is exceeded and will issue a warning when the counter is incremented a predetermined number of times.

The present invention also provides another method for detecting the improper mounting of a sensor on a motor vehicle having a first sensor and a second sensor. Each sensor emits output signals. The method comprises the steps of monitoring the output signals of the sensors, determining the noise levels in the output signals being emitted by each of the sensors and comparing the noise levels of the first sensor to the noise levels of the second sensor to determine if the sensors are properly mounted.

In one aspect of the invention, the vehicle has a longitudinal axis and comparing the noise levels of the sensors includes comparing the noise levels of two sensors that are positioned in substantially mirrored relation with respect to the longitudinal axis. In another aspect of the invention, the noise level of the first sensor is compared to a threshold value and a counter is incremented when the threshold value is exceeded. The noise level of the second sensor is also compared to a predetermined threshold value and a second counter is incremented when the threshold value is exceeded. The first and second counters are then compared to determine whether one of the sensors may be improperly mounted. A warning is issued when a sensor is determined to be improperly mounted.

In yet another aspect of the invention, determining the noise levels of the output signals can include filtering the signals. The signals can be filtered using a band-pass filter or a high-pass filter. The filtered output signals are then integrated and compared to determine whether there is an improperly mounted sensor.

In another aspect of the invention, the noise levels of sensors that are not positioned in substantially mirrored relation with respect to the longitudinal axis are compared by equalizing the noise levels of the two sensors. The noise levels are equalized using correction factors that are determined such that under normal driving conditions, the noise levels of the two sensors will be substantially equal.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
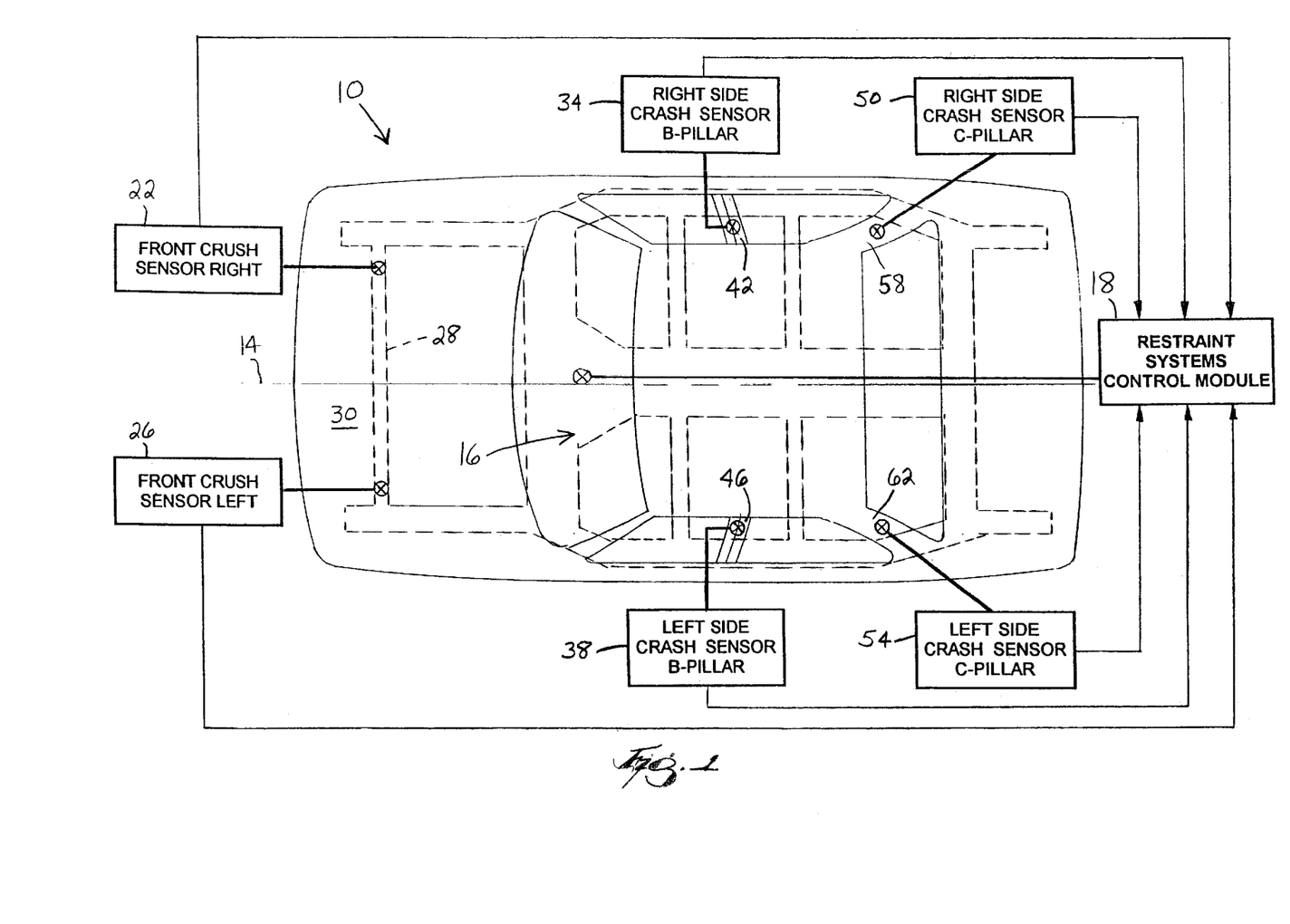
FIG. 1 is a top view of a vehicle with a restraint control module that uses the noise-detection method of the present invention.

FIG. 1 illustrates a vehicle 10 having an electronic crash detection system according to the invention. The vehicle 10 defines a longitudinal axis 14 and includes a passenger compartment 16. A central restraint system control module 18 is located within the passenger compartment 16. The central control module 18 includes one or more sensors in the form of accelerometers (not shown) that measure the deceleration within the passenger compartment 16. The sensor communicates with a restraint-deployment system (not shown) to deploy restraints when appropriate. While the illustrated embodiment uses accelerometers, it is understood that other types of sensors can be used as well.

In the illustrated embodiment, additional peripheral sensors are also mounted at various locations on the vehicle 10. FIG. 1 illustrates a right front crash sensor 22 and a left front crash sensor 26 that are mounted to a cross-frame member 28 in the front crumple zone 30 of the vehicle 10. Crash sensors 34 and 38 are mounted on the right side B-pillar 42 and the left side B-pillar 46, respectively. Crash sensors 50 and 54 are mounted on the right side C-pillar 58 and the left side C-pillar 62, respectively.

It is understood, however, that additional crash sensors can be located at other positions on the vehicle. Fewer sensors can also be used. It is also understood that the sensors can be mounted to the vehicle 10 using any appropriate means, for example, screws or bolts. In the illustrated embodiment, the sensors 22, 26, 34, 38, 50 and 54 are accelerometers, however, other types of sensors can also be used. As with the sensor in the central control module 18, when any of these sensors measure a deceleration in the vehicle 10 that reaches a predetermined deceleration threshold, the appropriate restraints are deployed within the passenger compartment 18 of the vehicle 10, as is understood by those skilled in the art.

Driving on roads always causes certain levels of acceleration and deceleration of the vehicle. Driving also generates vibrations that are observed as oscillatory signals by accelerometers. Driving on rough roads and driving over railway lines are two examples of conditions where oscillatory signals are prevalent. As a result, there is always a certain level of noise in the measured acceleration signals. The bumpier and rougher the road is, the higher the noise level in the acceleration signals will be.

The noise level measured by a loose sensor will be even higher than the noise level measured by a similarly situated, but properly mounted sensor. The loose sensor is subject to added vibration and movement, which increases the noise level measured by the loose sensor. It is this concept that is utilized by the invention to determine if a sensor is loose.

Figure 2:
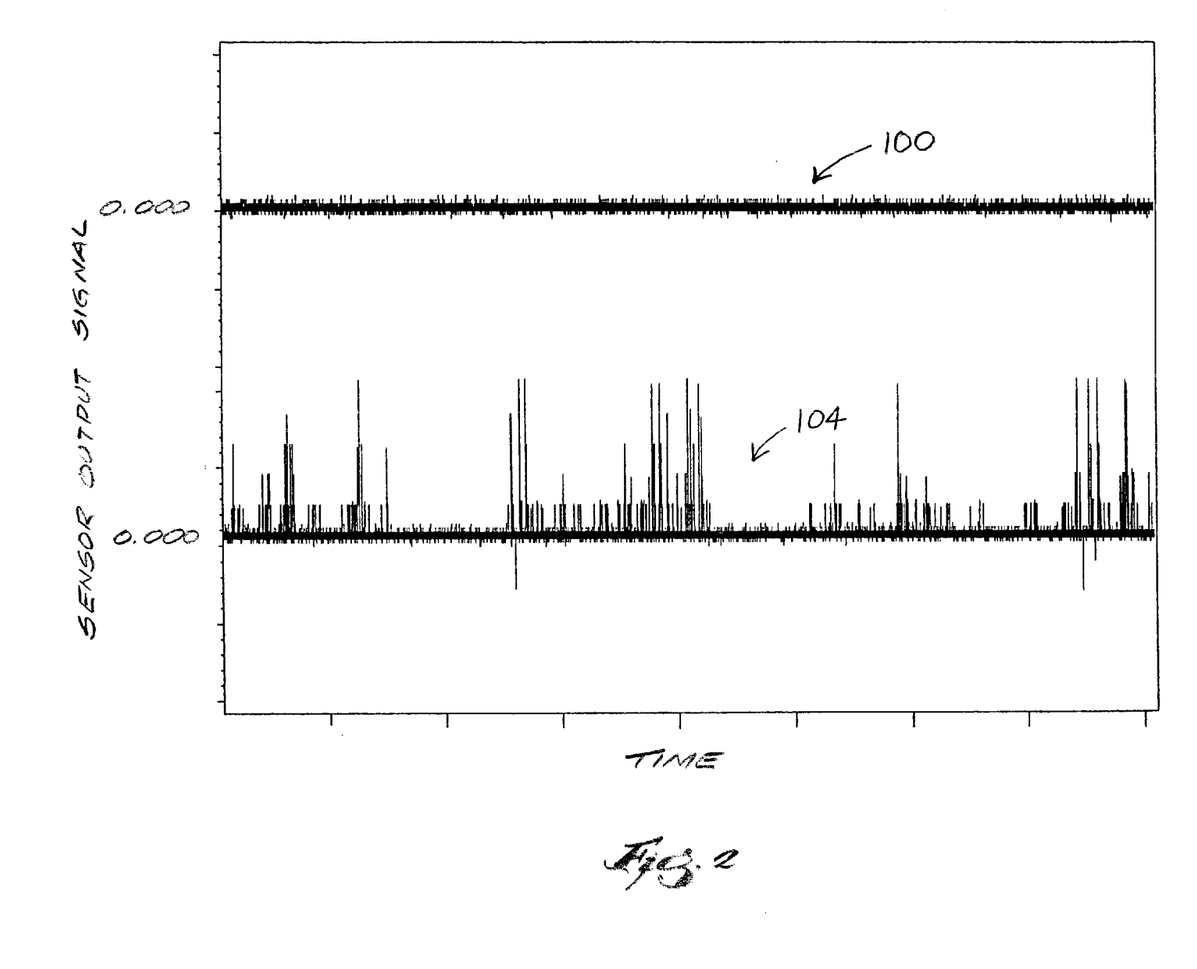
FIG. 2 is a graphical illustration showing two exemplary sensor output signals.

FIG. 2 illustrates exemplary signals that are recorded in low-noise and high-noise driving conditions. The upper signal 100 illustrates the recorded signal of a properly mounted sensor during low-noise driving conditions. The lower signal 104 illustrates the recorded signal of a properly mounted sensor during high-noise driving conditions and/or the recorded signal of a loose sensor. The higher than normal noise level in the lower signal 104 is apparent in the spikes in the oscillatory signals.

Acceleration signals in electronic restraint control systems are typically digitized. In peripheral sensors, the digitization may take place in the sensor itself, in which case the digitized signal is transmitted to the central control module 18 for analysis. If analog sensors are used, the analog signals can be digitized by the central control module 18 prior to the analysis. Regardless of the type of sensors used (analog or digital), the present invention utilizes the existing sensors and their generated signals so that no additional hardware is required.

According to the invention, acceleration signals of different sensors on the vehicle 10 are continuously monitored. The noise levels in those signals are compared to a threshold noise value and/or to the noise level in a counterpart sensor signal. Since the noise level of a loose sensor is different than the noise level of a properly affixed sensor, a loose sensor can be detected by comparing the noise levels. If a loose sensor is detected, a warning signal will be issued in the passenger compartment 16 to alert the driver that a sensor is improperly mounted. In the illustrated embodiments, that warning signal is the activation of a light in the passenger compartment 16 of the vehicle 10. It is understood, however, that the warning may take other forms, such as an audio alarm in the passenger compartment 16.

Different methods can be used to determine if a sensor is improperly mounted. The various methods can also be combined to increase reliability. In one embodiment, the measured acceleration signals of each sensor are compared with threshold values that are predetermined based on vehicle characteristics. During each cycle of the algorithm, if the threshold value for a given sensor is exceeded in either the positive or negative direction, a counter is incremented for that sensor. If a predetermined counter threshold is exceeded, the sensor is determined to be improperly mounted.

Taking this method further, the counters for the left and right side sensors at corresponding locations with respect to the longitudinal axis 14 of the vehicle 10 are compared. By comparing the corresponding counter values, a loose or improperly mounted sensor can be detected because the counter for the improperly mounted sensor will be significantly higher than the counter for a properly mounted sensor. If the noise counter of the first sensor is higher than the noise counter of the second sensor at the corresponding location by more than an adjustable reliance factor, the first sensor is determined to be loose and appropriate warnings can be issued.

Figure 3:
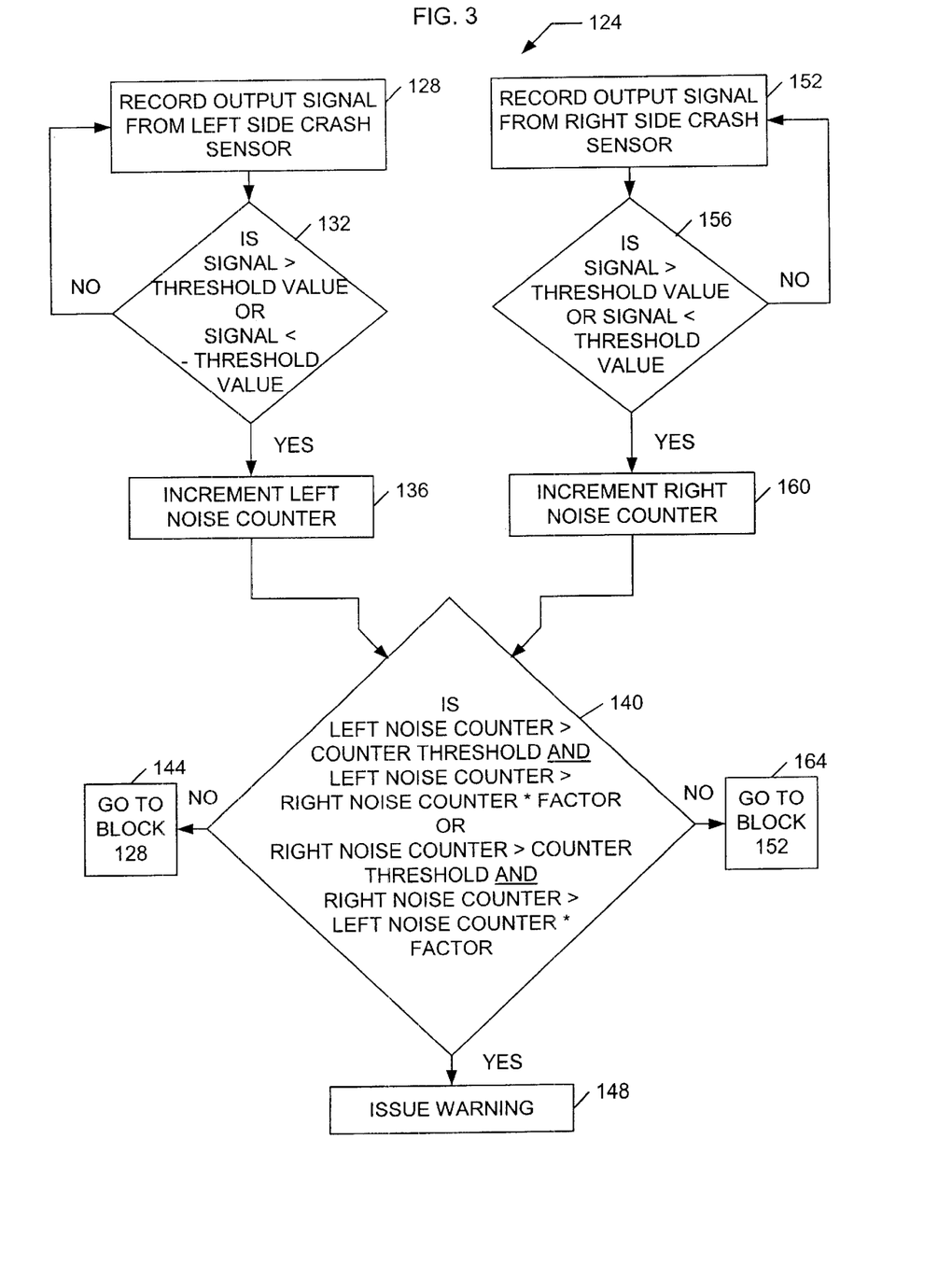
FIG. 3 is flow chart illustrating an algorithm embodying the present invention.

FIG. 3 outlines an algorithm 124 that can be used to practice the method according to the present invention. At block 128, the system records an output signal from the left side crash sensor. In the preferred embodiment, the output signal is an acceleration signal.

At block 132, the algorithm 124 determines if the output signal exceeds a predetermined signal threshold value. As mentioned above, the predetermined signal threshold value is chosen based on the specific vehicle characteristics. To increase reliability, the predetermined signal threshold value can be selected to help ensure that the sensor is actually loose rather than simply recording an increased signal value due to a bumpy road.

If the recorded signal does not exceed the signal threshold value (a NO answer at block 132), the algorithm 124 returns to block 128 and continues recording and monitoring the output signals. If the recorded signal exceeds the signal threshold value, i.e., is greater than the predetermined signal threshold value or is less than the negative signal threshold value (a YES answer at block 132), then a left noise counter is incremented at block 136 to signify the occurrence of a disparity that may have been caused by a loose sensor.

It is understood that any single instance where the recorded signal exceeds the signal threshold value can indicate a loose sensor. However, to reduce the chance of false detection of a loose sensor, the noise counter can be used so that no warnings will be issued before the noise counter has been incremented a predetermined number of times. This predetermined number of noise counter incrementations is known as the noise counter threshold, and can be varied as desired. The noise counter threshold will be discussed in more detail below.

To further improve the reliability of the system, the algorithm 124 also monitors the right side crash sensors in the same fashion. At block 152, the system records an output signal from the right side crash sensor. At block 156, the algorithm 124 determines if the recorded signal exceeds the predetermined signal threshold value for the right sensor. If the signal threshold value is not exceeded (a NO answer at block 156), the algorithm 124 returns to block 152 and continues to record and monitor the output signals. If the signal threshold value is exceeded (a YES answer at block 156), then a right noise counter is incremented at block 160. The right noise counter is employed for the same reliability reasons discussed above with respect to the left noise counter.

It is to be understood that the system could simply use the independent left and right side processes described thus far to determine whether the left side crash sensor or the right side crash sensor is loose. The system could utilize a predetermined noise counter threshold, that when exceeded, would trigger a warning in the passenger compartment 16. However, system reliability for the algorithm 124 is improved by next comparing the left noise counter to the right noise counter for sensors mounted at corresponding locations on opposing sides of the longitudinal axis 14. Crash sensors mounted in mirror-relation about the longitudinal axis 14 should have substantially similar output signal readings if the sensors are properly attached.

At block 140, the algorithm 124 compares the left and right noise counter values to determine whether one of the noise counters has been incremented a significant number of times more than the other. Before the actual comparison is made, and to improve reliability, the algorithm 124 first determines whether either of the noise counter values has reached a certain predetermined value, the noise counter threshold described above. By using the noise counter threshold, the algorithm 124 is making sure that the recorded sensor signals have exceeded their respective predetermined signal thresholds a significant number of times, i.e., the system has collected a sufficient amount of data.

If, at block 140, neither of the left or right noise counters have exceeded their respective noise counter thresholds, no comparison of the left and right counters is made. Rather, the algorithm 124 returns to blocks 128 and 152 (see blocks 144 and 164, respectively) to gather more data. If, on the other hand, one or both of the noise counters exceed their respective noise counter thresholds, the algorithm 124 continues on at block 140 to determine whether the left noise counter value is greater than the right noise counter value, and vice versa. In the illustrated embodiment, this comparison includes the use of an adjustable factor or multiplier that can be set as desired to ensure that the noise counter values are in fact different by a significant amount.

If, at block 140, either (1) the left noise counter is greater than the noise counter threshold and the left noise counter is greater than the right noise counter multiplied by the adjustable factor, or (2) the right noise counter is greater than the noise counter threshold and the right noise counter is greater than the left noise counter multiplied by the adjustable factor (a YES answer at block 140), a sensor is determined to be loose and a warning is issued in the passenger compartment 16 at block 148. As described above, the warning can be a light indicator, an audio alarm, or any other suitable warning device.

To further improve reliability and to further reduce the chance of false detection of a loose sensor, another comparison level can also be employed before issuing a warning. For example, if the noise counters of the two corresponding sensors differ by a certain adjustable factor, thereby indicating a disparity, the algorithm 124 can proceed to a second level of comparison using a second level or event counter for each of the left and right side sensors. The respective event counters are incremented each time the comparison of noise counters indicates the likelihood of a loose sensor. The noise counters of both sensors are then reset to zero and the noise measurements start from the beginning. When an event counter reaches a certain adjustable event counter threshold value, the corresponding sensor is determined to be loose and a warning is issued.

Figure 4:
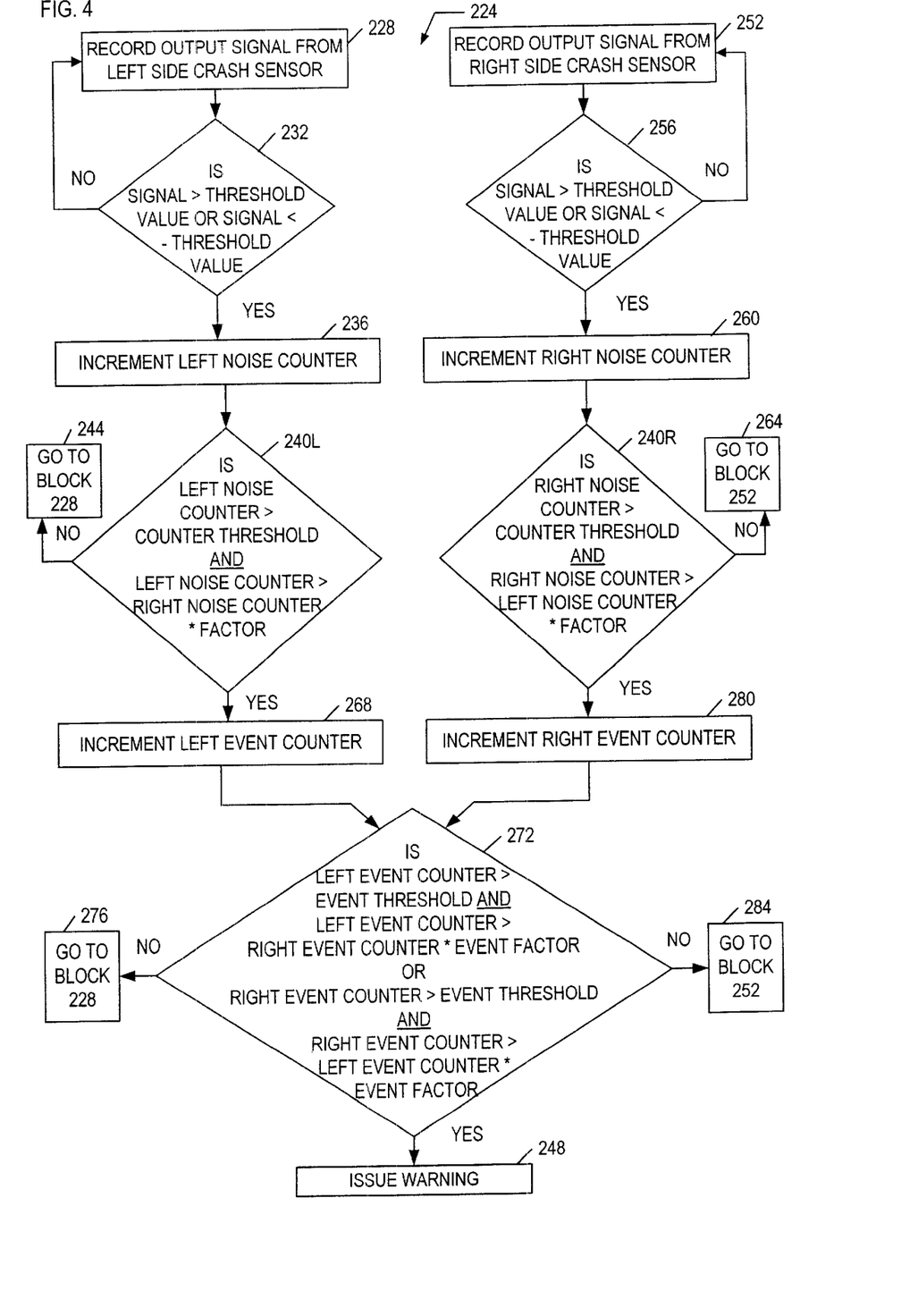
FIG. 4 is a flow chart illustrating another embodiment of an algorithm according to the present invention.

FIG. 4 illustrates such a system embodied in an algorithm 224. Up to a point, the algorithm 224 is substantially similar to the algorithm 124 of FIG. 3, and like blocks have been given like reference numerals of the two hundred series.

At blocks 240L and 240R, the algorithm 224 compares the left and right noise counter values to determine whether one of the noise counters has been incremented a significant number of times more than the other (similar to block 140 described above in FIG. 3). Again, by using the noise counter threshold, the algorithm 224 is making sure that the system has collected a sufficient amount of data to insure an accurate reading.

If, at blocks 240L and 240R, the left or right noise counters have not exceeded their respective noise counter thresholds, no comparison of the left and right counters is made (a NO answer at blocks 240L and 240R). Rather, the algorithm 224 returns to blocks 228 and 252 (see blocks 244 and 264, respectively) to gather more data. If, on the other hand, one or both of the noise counters exceed their respective noise counter thresholds, the algorithm 224 continues on at blocks 240L and 240R to determine whether the left noise counter value is greater than the right noise counter value, and vice versa.

In the embodiment illustrated in FIG. 4, an additional step is added to further increase the reliability of the system. If, at block 240L, the left noise counter is greater than the noise counter threshold and the left noise counter is greater than the right noise counter multiplied by an adjustable factor (a YES answer at block 240L), the algorithm 224 increments a left event counter for the system at block 268 to indicate the occurrence of a disparity that may have been caused by a loose sensor.

It is again understood that any single instance where the noise counter exceeds the noise counter threshold can indicate a loose sensor. However, to reduce the chance of false detection of a loose sensor, a second counter, known as the event counter, can be used so that no warnings will be issued before the event counter has been incremented a predetermined number of times. This predetermined number of event counter incrementations is known as the event counter threshold and can be varied as desired. The event counter threshold will be described in detail below. By employing the event counter, the system is essentially performing another check to further insure that false warnings are reduced or eliminated.

The algorithm 224 also monitors the right side in the same fashion. If, at block 240R, the right noise counter is greater than the noise counter threshold and the right noise counter is greater than the left noise counter multiplied by an adjustable factor (a YES answer at block 240R), the algorithm 224 increments a right event counter for the system at block 280 to indicate the occurrence of a disparity that may have been caused by a loose sensor.

It is to be understood that the system could use the independent left and right processes described thus far to determine whether the left side crash sensor or the right side crash sensor is loose. However, system reliability for the algorithm 224 is further improved by comparing the left event counter to the right event counter for sensors mounted at corresponding locations on opposing sides of the longitudinal axis 14.

At block 272, the algorithm 224 compares the left and right event counter values to determine whether one of the event counters has been incremented a significant number of times more than the other. Before the actual comparison is made, the algorithm 224 first determines whether either of the event counter values has reached a certain predetermined value, the event counter threshold described above. By using the event counter threshold, the algorithm 224 is making sure that the system has collected a sufficient amount of data to insure an accurate reading of the sensors.

If, at block 272, the left or right event counters have not exceeded their respective event counter thresholds, no comparison of the left and right event counters is made. Rather, the algorithm 224 returns to blocks 228 and 252 (see blocks 276 and 284, respectively) to gather more data. If, on the other hand, one or both of the event counters have exceeded their respective event counter thresholds, the algorithm 224 continues on at block 272 to determine whether the left event counter value is greater than the right event counter value, and vice versa. In the illustrated embodiment, this comparison includes the use of an adjustable event factor or multiplier that can be set as desired to ensure that the event counter values are in fact different by a significant amount.

If, at block 272, either (1) the left event counter is greater than the event counter threshold and the left event counter is greater than the right event counter multiplied by the adjustable event factor, or (2) the right event counter is greater than the event counter threshold and the right event counter is greater than the left event counter multiplied by the adjustable event factor (a YES answer at block 272), a sensor is determined to be loose and a warning is issued in the passenger compartment 16 at block 248. As described above, the warning can be a light indicator, an audio alarm, or any other suitable warning device.

Those skilled in the art would understand that modifications to the algorithms 124 and 224 could be made without deviating from the invention. For example, while the algorithms 124 and 224 both incorporate the use of adjustable multipliers (see blocks 140, 240L, 240R, and 272) to insure that the two counters being compared differ significantly, these adjustable multipliers could be eliminated.

Reliability could also be increased by adding one or more filtering steps between blocks 128 and 132 for the left side readings and between blocks 152 and 156 for the right side readings in FIG. 3. Likewise, the filtering step could be added between blocks 228 and 232, as well as 252 and 256, in FIG. 4. In one embodiment, the filtered signals can be integrated and the algorithm 124 (or 224) could proceed using the integrated signals.

In one embodiment, the noise level of each sensor is measured by filtering the acceleration signal of each sensor with a band-pass filter of appropriate upper and lower cutoff frequencies. Typically, the lower cutoff frequency is in the range of 100 Hz to 300 Hz and the upper cutoff frequency is in the range of 500 Hz to 1000 Hz. Preferably, the lower cutoff frequency is set at approximately 200 Hz and the upper cutoff frequency is set at approximately 600 Hz, however, the filter frequencies are adjustable based on the specific vehicle.

The filtered output signals are then integrated and the integrated signals from corresponding sensors are compared using the algorithms 124 and 224. If the "noise integral" of a sensor has exceeded a predetermined threshold, that noise integral is compared with the noise integral of the opposing sensor on the corresponding location. If the noise integrals differ by an adjustable factor, an event counter for that sensor is incremented and the noise integrators are set to zero, starting the process over again. If the event counter reaches a certain event counter threshold value, the corresponding sensor is determined to be loose and a warning is issued.

In another embodiment, the signals can be filtered using an adjustable high-pass filter with the cutoff frequency adjusted to the specific vehicle. The typical cutoff frequency is in the range of 100 Hz to 300 Hz, with the preferred setting being approximately 200 Hz. The operation would proceed substantially as described above with respect to the band pass filter embodiment.

All of the above-described methods for measuring and monitoring the noise generated by an improperly mounted sensor compare corresponding sensors that are positioned in substantially mirrored relation to each other with respect to the longitudinal axis 14 of the vehicle 10. However, the method of the present invention can also be used to detect loose sensors by comparing the noise levels of two sensors that are not positioned in substantially mirrored relation with respect to the longitudinal axis 14.

For example, the noise levels of the crash sensor 50 on the right C-pillar 58 can be compared with the noise levels of the right front crash sensor 22 to determine whether the sensor 50 on the right C-pillar 58 is properly mounted. To accomplish this, the measured noise levels of the sensors 22 and 50 are equalized using a correction factor, prior to comparing the noise levels. The correction factor is calibrated such that under ordinary driving conditions, the noise level of all the sensors at different locations are substantially equalized. Any of the above-described methods may then be used to determine whether a sensor is loose. If one of the sensors becomes loose, the increased corrected noise level of that sensor will be identified by one of the above-described methods, and a warning will be issued.

Finally, it should be noted that central control module 18 preferably includes storage capacity to temporarily store all the current counter values when power to the central control module is switched off. When the power is restored, the monitoring process resumes using the stored counter values.

Various features of the invention are set forth in the following claims.

What is claimed is:

1. A method of detecting improper mounting of a sensor on a motor vehicle, the sensor emitting output signals, the method comprising:
   monitoring the output signals of the sensor;
   determining noise levels in the output signals; and
   comparing the noise levels from the output signals of the sensor to a threshold noise value to determine if the sensor is properly mounted.

2. The method of claim 1, wherein the threshold noise value is predetermined based on vehicle characteristics.

3. The method of claim 1, wherein the threshold noise value is determined from another sensor mounted on the vehicle.

4. The method of claim 1, further comprising:
   issuing a warning when the noise levels exceed the threshold noise value.

5. The method of claim 4, wherein the warning is an activation of a light in a passenger compartment of the vehicle.

6. The method of claim 1, further comprising:
   incrementing a counter each time the threshold value is exceeded; and
   issuing a warning when the counter is incremented a predetermined number of times.

7. The method of claim 1, wherein the sensor is an acceleration sensor that emits acceleration signals.

8. A method of detecting improper mounting of a sensor on a motor vehicle, the motor vehicle having a first sensor and a second sensor that each emit output signals, the method comprising:
   monitoring the output signals of the sensors;
   determining the noise levels in the output signals being emitted by each of the sensors; and
   comparing the noise levels of the first sensor to the noise levels of the second sensor to determine if the sensors are properly mounted.

9. The method of claim 8, wherein the vehicle has a longitudinal axis and wherein comparing the noise levels of the sensors includes comparing the noise levels of two sensors that are positioned in substantially mirrored relation with respect to the longitudinal axis.

10. The method of claim 8, further comprising:
    issuing a warning when a sensor is determined to be improperly mounted.

11. The method of claim 10, wherein the warning is an activation of a light in a passenger compartment of the vehicle.

12. The method of claim 8, wherein comparing the noise levels includes:
    comparing the noise levels of the first sensor to a predetermined threshold value and incrementing a first counter when the threshold value is exceeded;
    comparing the noise levels of the second sensor to a predetermined threshold value and incrementing a second counter when the threshold value is exceeded; and
    comparing the first and second counters to determine whether one of the sensors may be improperly mounted.

13. The method of claim 12, wherein the predetermined threshold value is adjustable based on vehicle characteristics.

14. The method of claim 8, wherein determining the noise levels in the output signals of the sensors includes filtering the signals.

15. The method of claim 14, wherein the signals are filtered using a band-pass filter.

16. The method of claim 14, wherein the signals are filtered using a high-pass filter.

17. The method of claim 14, wherein determining the noise levels in the output signals further includes integrating the filtered output signals.

18. The method of claim 8, wherein the vehicle has a longitudinal axis and wherein comparing the noise levels of the sensors includes comparing the noise levels of two sensors that are not positioned in substantially mirrored relation with respect to the longitudinal axis, the method further comprising:
    prior to comparing the noise levels, substantially equalizing the noise levels of the two sensors using correction factors, the correction factors being determined such that under normal driving conditions, the noise levels of the two sensors will be substantially equal.

19. The method of claim 8, wherein the sensors are acceleration sensors that emit acceleration signals.

20. A method of detecting improper mounting of an acceleration sensor on a motor vehicle, the motor vehicle having a first acceleration sensor and a second acceleration sensor that each emit acceleration signals, the method comprising:
    monitoring the acceleration signals of the sensors;
    determining the noise levels in the acceleration signals being emitted by each sensor;
    comparing the noise levels of the first sensor to the noise levels of the second sensor to determine if the sensors are properly mounted, comparing the noise levels including:
        comparing the noise levels of the first sensor to a predetermined threshold value and incrementing a first counter when the threshold value is exceeded;
        comparing the noise levels of the second sensor to a predetermined threshold value and incrementing a second counter when the threshold value is exceeded; and
        comparing the first and second counters to determine whether one of the sensors may be improperly mounted; and issuing a warning when a sensor is determined to be improperly mounted.

21. The method of claim 20, wherein determining the noise levels in the acceleration signals of the sensors includes filtering the signals.

22. The method of claim 20, wherein the predetermined threshold is adjustable based on vehicle characteristics.

23. The method of claim 8, wherein monitoring the output signals of the sensors includes monitoring the output signals without inputting a test signal from a test signal generator.

24. The method of claim 20, wherein monitoring the accleration signals of the sensors includes monitoring the accleration signals without inputting a test signal from a test signal generator.

25. A method of detecting improper mounting of a sensor on a motor vehicle, the sensor emitting output signals, the method comprising:

monitoring the output signals of the sensor without inputting a test signal from a test signal generator;

determining noise levels in the output signals; and comparing the noise levels in the output signals of the sensor to a threshold noise value to determine if the sensor is properly mounted.

26. The method of claim 25, wherein the threshold noise value is predetermined based on vehicle characteristics.

27. The method of claim 25, wherein the threshold noise value is determined from another sensor mounted on the vehicle.

28. The method of claim 25, further comprising:

issuing a warning when the noise levels exceed the threshold noise value.

29. The method of claim 28, wherein the warning is an activation of a light in a passenger compartment of the vehicle.

30. The method of claim 25, further comprising:

incrementing a counter each time the threshold value is exceeded; and issuing a warning when the counter is incremented a predetermined number of times.

31. The method of claim 25, wherein the sensor is an acceleration sensor that emits acceleration signals.

* * * * *